A. D. JONES.
COMBINED CARBONATING AND BEER DISPENSING APPARATUS.
APPLICATION FILED AUG. 31, 1909.
963,047.
Patented July 5, 1910.
6 SHEETS—SHEET 2.
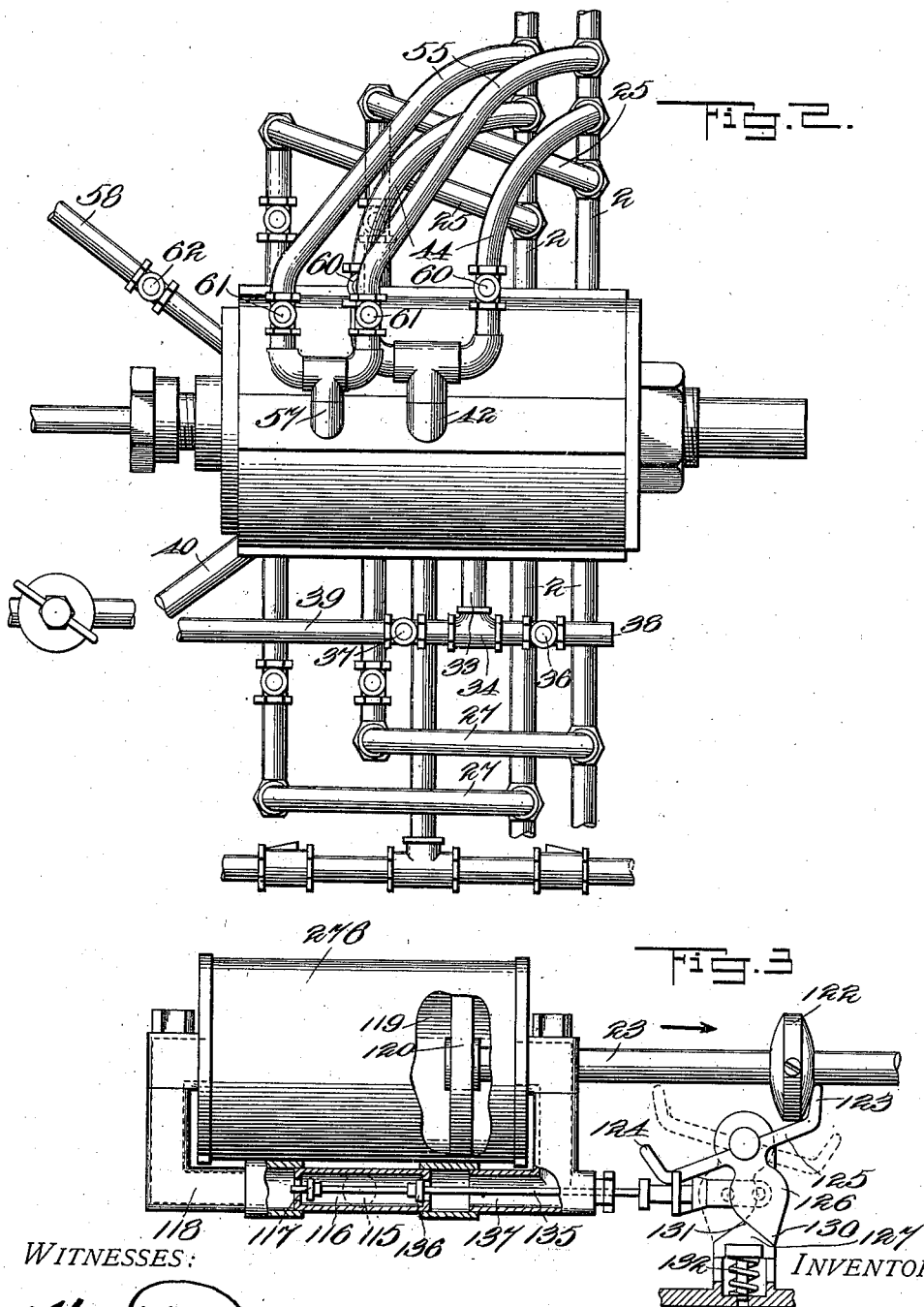

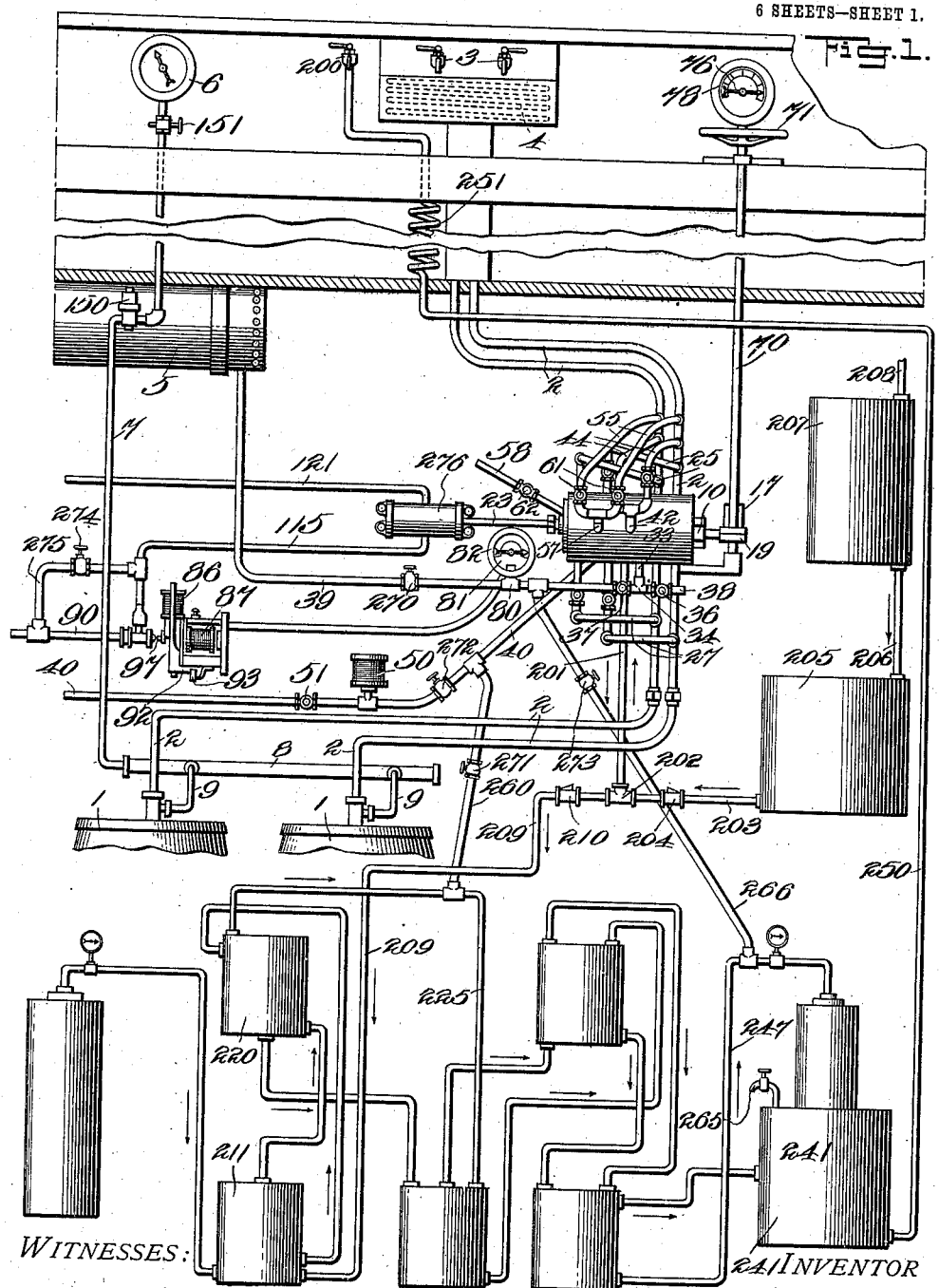

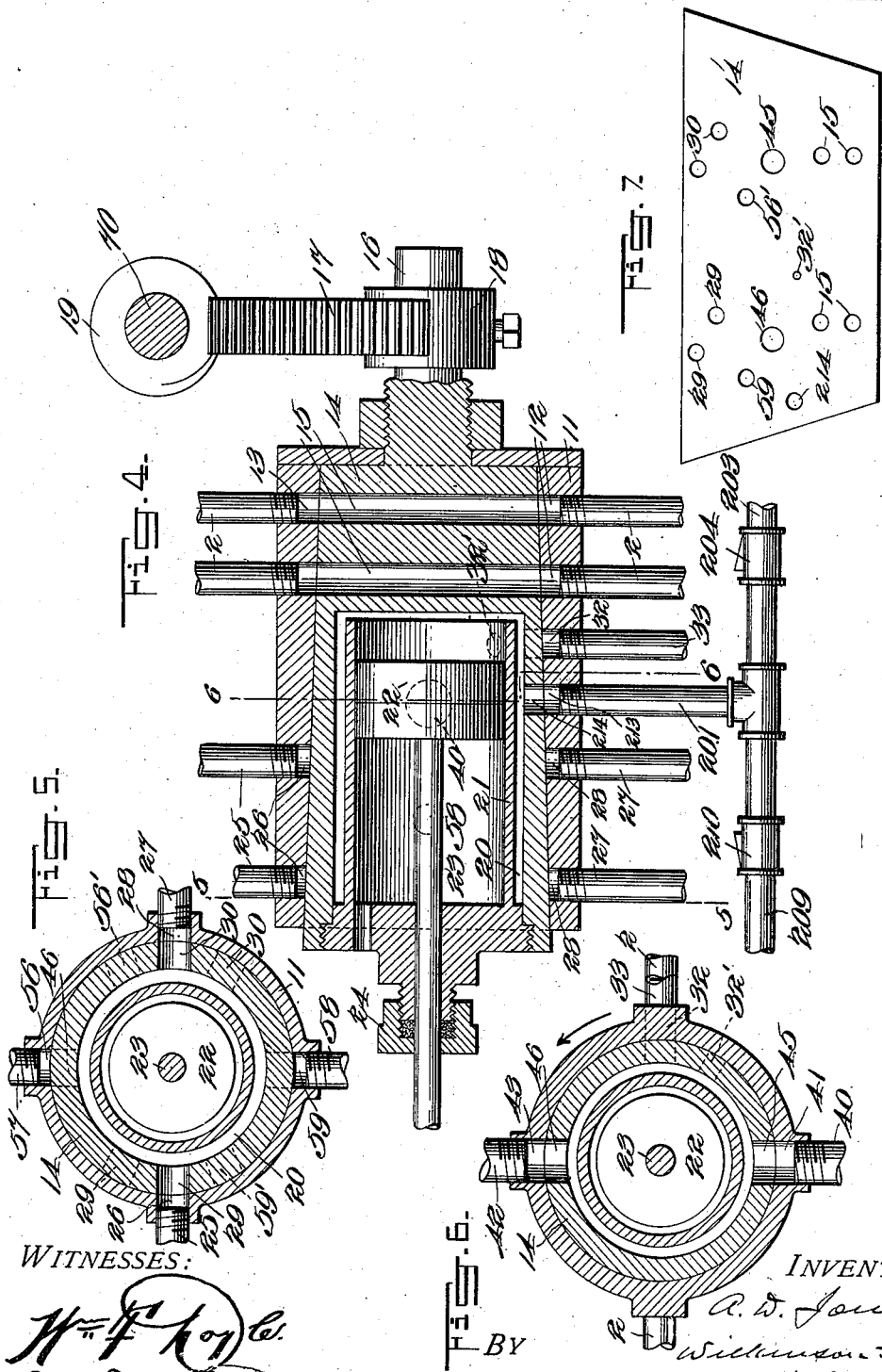

A. D. JONES.
COMBINED CARBONATING AND BEER DISPENSING APPARATUS.
APPLICATION FILED AUG. 31, 1909.
963,047.
Patented July 5, 1910.
6 SHEETS—SHEET 4.
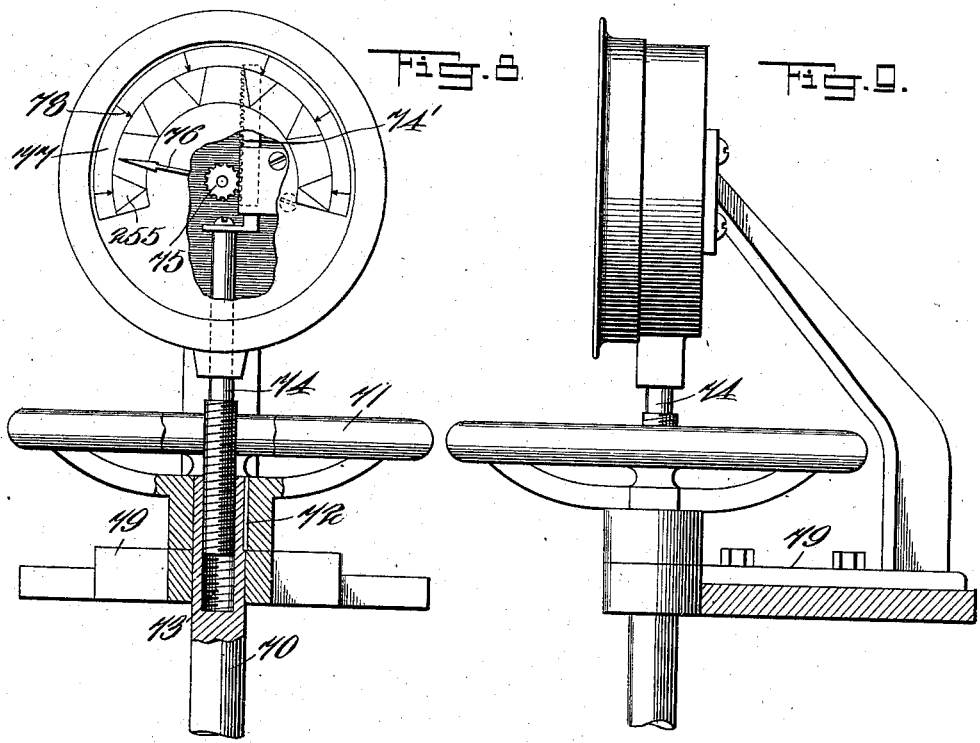
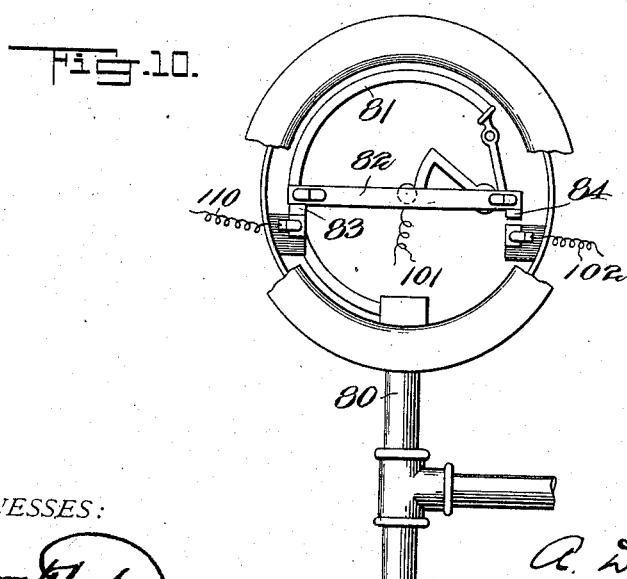
WITNESSES:
INVENTOR
Attorneys A. D. JONES.
COMBINED CARBONATING AND BEER DISPENSING APPARATUS.
APPLICATION FILED AUG. 31, 1909.
963,047.
Patented July 5, 1910.
6 SHEETS—SHEET 5.
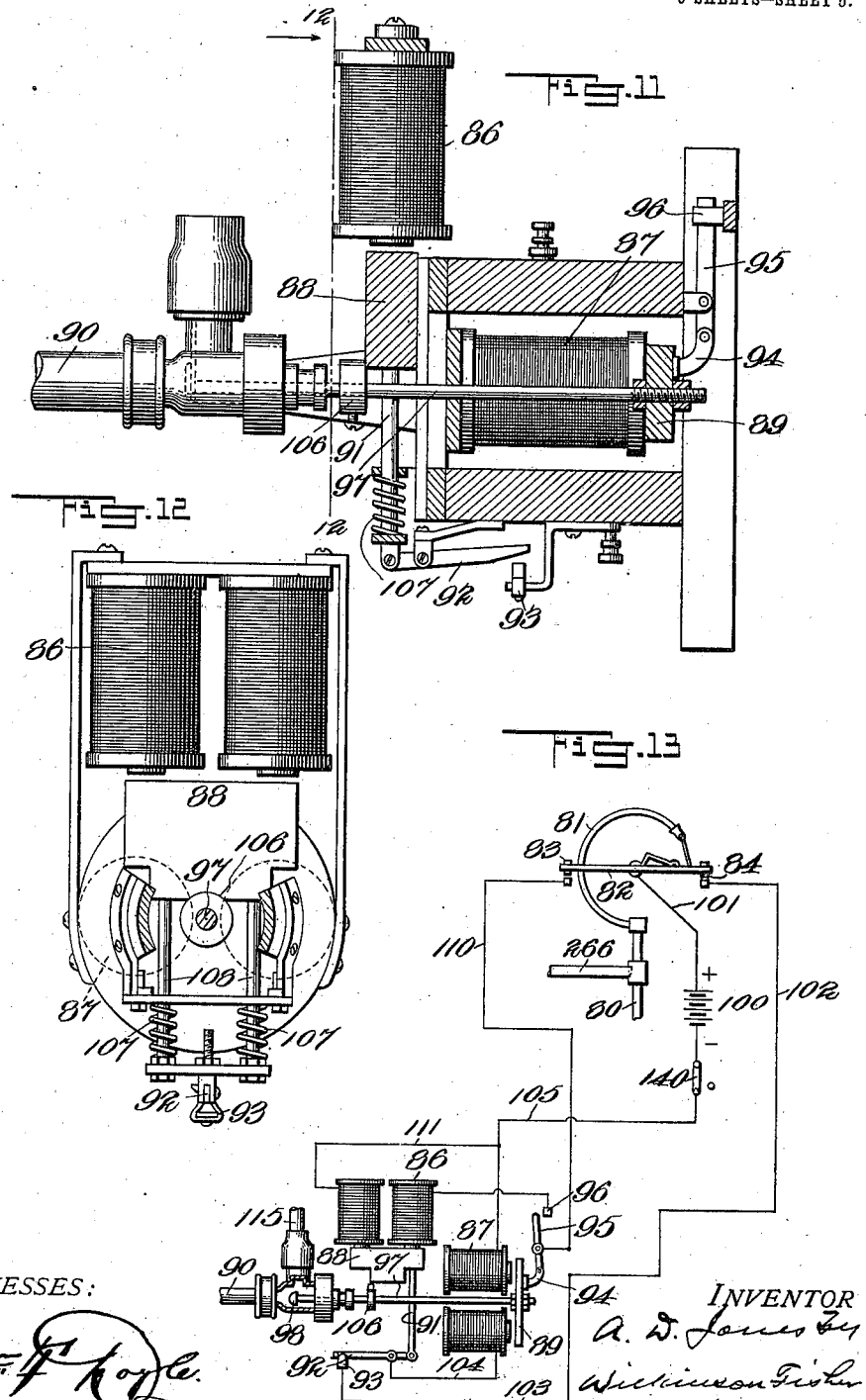

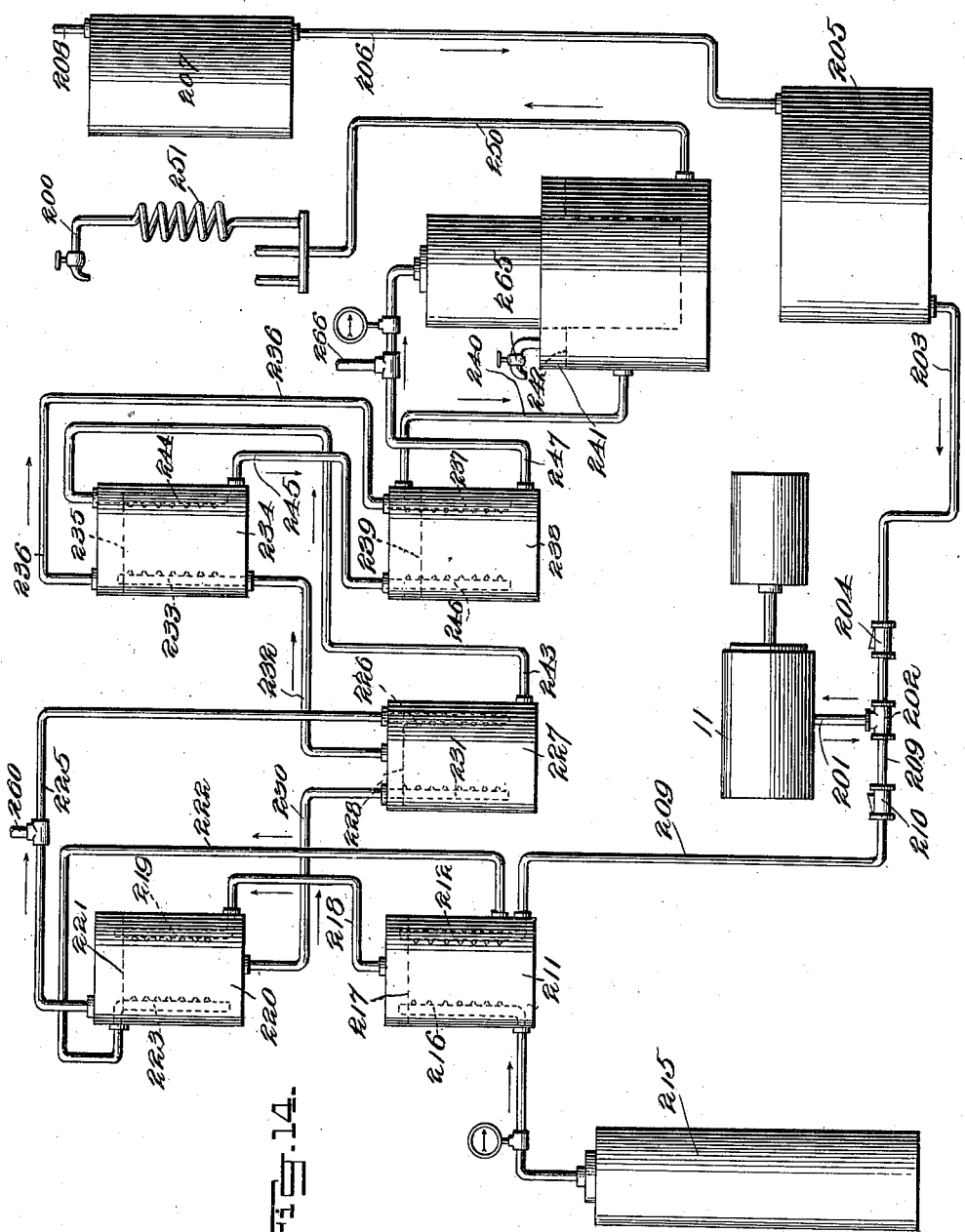

UNITED STATES PATENT OFFICE.

ALVA D. JONES, OF LOUISVILLE, KENTUCKY, ASSIGNOR TO NATIONAL HYGIENIC SERVICE COMPANY, OF LOUISVILLE, KENTUCKY, A CORPORATION OF KENTUCKY.

COMBINED CARBONATING AND BEER-DISPENSING APPARATUS.

963,047.      Specification of Letters Patent.      Patented July 5, 1910.

Application filed August 31, 1909. Serial No. 515,494.

*To all whom it may concern:*

Be it known that I, ALVA D. JONES, a citizen of the United States, residing at Louisville, in the county of Jefferson and State of Kentucky, have invented certain new and useful Improvements in Combined Carbonating and Beer - Dispensing Apparatus; and I do hereby declare the following to be a full, clear, and exact description of the invention, such as will enable others skilled in the art to which it appertains to make and use the same.

This invention relates to a device for dispensing carbonated water and for returning the beer back into the kegs from the cooling coils employed in connection with beer dispensing apparatus; and it has for its object the production of a machine that will not only accomplish these purposes but will also not destroy the taste of the beer while at the same time it will maintain the proper pressure on the beer although the original pressure may be decreased.

With these and other objects in view the invention consists in the novel details of construction and combinations of parts more fully hereinafter described and particularly pointed out in the claims.

Referring to the accompanying drawings forming a part of this specification in which like numerals refer to like parts in all the views: Figure 1 is a diagrammatic elevational view of a combined carbonating and beer dispensing apparatus made in accordance with the invention; Fig. 2 is a plan view of the multi-way valve and its connections; Fig. 3 is an elevational view partly in section of a water motor for operating the pump; Fig. 4 is a longitudinal sectional view of the multi-way valve showing the pump; Fig. 5 is a sectional view taken on the line 5—5 of Fig. 4; Fig. 6 is a like view taken on the line 6—6, Fig. 4, with the valve in another position; Fig. 7 shows the valve plug opened out and the relative arrangement of the ports therethrough; Fig. 8 is a front elevational view partly in section, of the indicator; Fig. 9 a side elevational view of the parts shown in Fig. 8; Fig. 10 a front elevational view, partly broken away, of an automatic contact device; Fig. 11 a side elevational view, partly in section, of an electro-magnetic water cut off; Fig. 12 an end elevational view of certain parts of said cut off, taken on the line 12—12 of Fig. 11; Fig. 13 is a diagram of the circuits employed in said cut off; and Fig. 14 is a diagrammatic view of the carbonating parts alone.

In order to render more clear the construction and operation of this invention I will first describe that portion which dispenses beer, and then describe the structure relating to the carbonation and dispensation of the carbonated water.

Referring to the beer apparatus:—1 represents the beer supply, 2 the service pipes leading therefrom, 3 the dispensing faucets and 4 the cooling coils through which the beer passes before reaching said faucets.

5 represents an air or carbonic acid gas reservoir, 6 a pressure gage, 7 a pipe connecting said reservoir with the manifold 8, and 9 the usual connections from the pressure supply to the surface of the beer.

As is well known at present it is customary to leave the cooling coils 4 full of beer over night, and it is equally well known that such beer is flat or has so lost its flavor next morning that it is generally thrown away, thus entailing a considerable loss of beer every twenty-four hours. In order to save this loss of beer there is interposed in the service pipes a multi-way valve 10, provided with an outer casing 11 having the ports 12 into which the pipes 2 are screwed, and having the ports 13 by which they leave said casing. Fitting the casing 11 is a tapered plug 14, having the ports 15 adapted to register in certain positions of said plug with the ports 12 and 13. This tapered plug 14 is provided with an extension 16, on which is secured the cogged rack 17 as by the collar 18, and this rack is adapted to be turned by the worm 19 as will more fully appear below.

The plug 14 is provided with a cavity 20, into which is screwed the open ended cylinder 21, provided with the piston 22 and piston rod 23, as shown.

24 is a suitable stuffing box through which the piston rod passes.

Each of the service pipes 2 is provided with a connection 25 which is joined to the ports 26 in the casing 11, and said pipes 2 are also each provided with connections 27 which are connected with the ports 28 in the casing 11, as illustrated. The plug 14 is provided with ports 29 adapted to register with the ports 26, and is also provided with ports 30 adapted to register with the ports 28 when the plug is in a certain position. The ports 29 and 30 open into the cavity 20 and therefore connect with the open end of the cylinder 21.

When the plug is in the position shown in Fig. 5, it is evident that beer can flow from the upper sections of the pipes 2 through the connections 25, through ports 26 and 29 into the cavity 20, out of the ports 30 and 28 through the connections 27 and back into the lower sections of the pipes 2. It is also evident that if the piston 22 is reciprocated and there is beer in the coils 4 while the faucets 3 are open that the said beer will be sucked into the cylinder 21 through said connections 25 and forced out of said cylinder through said connections 27 and pipes 2 back into the kegs.

The casing 11 is further provided with a port 32 into which screws the pipe 33 connected to the tee 34 provided with the check valves 36 and 37. The check valve 36 communicates with the atmosphere through the connection 38, and the check valve 37 connects with the reservoir 5 through the pipe 39. It is evident that when the pump is operated air will be sucked into the cylinder 21 through the connection 38, and ports 32 and 32' and forced under pressure into the reservoir 5 through the pipe 39.

40 represents a water supply connected with the port 41, in the casing 11, and 42 represents a tee connecting with the port 43 in said casing. The tee 42 is provided with branches 44 connecting with the service pipes 2, as best shown in Fig. 2. The plug 14 is provided with a port 45 adapted to register with the port 41, and also with the port 46 adapted to register with the port 43, when the plug is turned as indicated by the arrow in Fig. 6. When the said ports 41 and 45 and 43 and 46 do register, water will enter the cylinder 21 and be forced by the piston 22 through the connections 44 to and through the pipes 2 and faucets 3, as will be readily understood. The said water supply 40 is also connected with a supply 50 of cleansing medium and is also provided with a check valve 51. Therefore, when the pump is operated water and cleansing medium may be sucked into said pump and forced out through the service pipes, coils and faucets.

55 represents connections between the service pipes 2 and the tee 57, entering the port 56 of the casing 11; and 58 represents a drain pipe entering the port 59 of the casing 11. As the pump reciprocates the water that is forced upwardly through the connections 44 and pipes 2, may be sucked back through the connections 55 57 and forced out of the port 59 and drain 58, provided the plug 14 is turned to bring the proper ports into register. The connections 44 are provided with suitable check valves 60 and the connections 55 are also provided with like but oppositely set valves 61, and the drain 58 is provided with a suitable check valve 62, see Fig. 2, to insure the proper operation of the parts.

The various operations above described briefly will take place only when the proper ports are brought into register. In order to accomplish this, the worm 19 is provided with a rod 70 provided with a hand wheel 71, keyed at 72 to said rod, see Fig. 8. Said rod receives in a screw threaded socket 73, a screw threaded stem 74 provided at its upper end with an off set rack 74', engaging the pinion 75, carrying the pointer 76, playing over the dial 77, provided with the divisions 78 one for each position of the plug 14. The hand wheel 71 rests upon the stationary support 79 for the dial 77, and therefore when said wheel is turned the rod 70 will be turned and the stem 74 forced up or down, thereby compelling the pointer 76 to assume a corresponding position on the dial 77. The gears 17, 19, are so proportioned that when the pointer 76 indicates a certain division 78 of the dial, the service pipes 2, 2, will be in communication with the bar as indicated in Fig. 4, and when the hand wheel is so turned that another division is indicated, another set of ports, say 26 and 29, 28 and 30, will be brought into register. Each division 78 is appropriately lettered to indicate the particular set of ports that are in register when the pointer 76 indicates the division in question.

As above stated when the ports 32 and 32' (Figs. 4 and 7) are in register and the pump is operated air will be forced into the reservoir 5. But it is desirable to provide an automatic cut off for the pump, which will not only stop the operation thereof when the pressure gets too high, but will also start its operation when the pressure in the reservoir falls below a predetermined point. To these ends there is attached to the pipe 39 a connection 80 joined to a well known type of Bourdon pressure indicating device 81, but having the cross bar 82 provided with the contacts 83 and 84, all as will be readily understood from Figs. 1, 10 and 13.

100 represents any suitable source of current, 86 and 87, suitable electromagnets, 88 and 89, armatures for the same, and 90 a water supply for the motor controlled by said armature, as will be presently explained.

91 represents a rod connecting the armature 88 with the lever 92, making contact at 93, and 94 represents a connection between the armatures 89 and the lever 95 making contact at 96. The armature 89 also controls the water supply 90 through the connection 97 with the valve 98, and therefore controls the starting and stopping of the motor, as will now appear.

When the pressure in the reservoir gets too high the air will enter the Bourdon tube 81 through the connection 80 and tend to straighten out said tube. This will cause the circuit to be made at 84, and current will flow from the source 100 through the wire 101, contact 84, wires 102, 103, contacts 93, 92, wire 104, magnet 87 and wire 105, switch 140 back to the source 100. This will cause the armature 89 to be attracted, the valve 98 to be seated and the contacts 95, 96 to be closed. The closing of this valve will also permit the armature 88 to fall down behind the lug 106 carried by the rod 97 and to lock said valve closed against the pressure of the water in the pipe 90, see Fig. 11. The springs 107, surrounding the pins 108 carried by the armature 88 assist in this locking movement, while the connection 91 forces open the contacts 92 and 93. The water will now remain cut off and the pump stopped until the reduction of pressure in the reservoir 5, permits the contact 83 to close its circuit, when current will flow from the source 100 through the wire 101, contact 83, wire 110, contacts 95, 96, now closed, magnet 86, wire 111, and back to source 100 over wire 105. The passage of a current through the magnet 86 over the circuit last described, will cause the armature 88 to be retracted into the position shown in Fig. 13 and the valve 98 to be unlocked, whereupon the pressure of water in the pipe 90 will force said valve open, carrying the armature 89 with it and therefore, open the contacts 95 and 96. In the meantime the contacts 92, 93 are remade, through the action of springs 107 and the parts are again in the position shown in said Fig. 13, ready to have the cycle of operations repeated. It will be observed that no matter which position the parts may be in, as soon as the water has been turned on, or turned off, the current is also automatically cut off, so that no waste occurs.

When the water passes the valve 98 it enters the pipe 115 and passes into the valve chamber 116 of the motor pump, from which it flows past the valve 117 into the channel 118 and into the motor pump cylinder 119, where it forces the piston 120 in the direction of the arrow, Fig. 3. The piston rod 23 carries a lug 122, adapted as it reciprocates to strike the tappets 123 and 124 on the pivoted lever 125, provided with the pointed projection 126, taking against the spring pressed latch 127.

When the water has forced the piston and lug 122 to their extreme position in the direction shown, the tappet 123 will be struck, the lever 125 turned, the point 130 of the projection 126 brought slightly beyond the extreme tip 131 of the latch 127, whereupon the spring 132 will force the latch upwardly and force the lever 125 over into the dotted line position. The projection 126 is connected through the rod 135 with the valves 117 and 136 and therefore when the lever assumes its dotted line position the valve 117 will be closed and the valve 136 opened. This will permit water to flow through the channel 137 to the other side of the piston 120 and the same will move in a direction opposite to that of the arrow until the tappet 124 is struck by the lug 122 when the reverse operation takes place. In other words the piston rod 23 will continue to reciprocate as long as water under pressure is admitted to the valve chamber 116. In practice it is found desirable to employ a duplicate valved chamber, not shown, and to permit the water from the cylinder 119 to flow out of the several chambers into a waste pipe such as 121, all as is well known to those conversant with water motors.

The piston rod 23 will in turn, of course, reciprocate the piston 22 of the beer pump so long as the air pressure in the reservoir 5 is sufficiently low to close the contact 83, provided the circuit is closed at the switch 140.

The operation of the beer dispensing portion of this invention will be clear from the foregoing but may be briefly summarized as follows: Of course, as many kegs 1 and as many kinds of beverages may be employed as desired, two being illustrated by way of example only, and when it is desired to serve such beverages the hand wheel 71 is turned until the pointer 76 designates the division 78 marked "Service daily", when a port 15 for each kind of beverage served will be brought into communication with its corresponding service pipe 2, and as many faucets 3 as there are service pipes will be supplied, each with their appropriate beverage, all as is well known. When the bar is to be closed, however, and it is desired to save the respective beverages with which the various cooling coils 4 are filled, the hand wheel is turned until the pointer designates the division 78 marked say "Return light beer," which will bring the ports 26, 29, and 30, 28, into line, when the current switch 140 is also closed, whereupon, if the pressure in the reservoir 5 is not above the normal the motor will start, which, in turn, will force the beer pump into action. The latter will, thereupon, suck such beer through the appropriate pipe 2, and branch connections 25, into the cylinder 21, and the piston 22 will force the same out through the connections 27, and lower pipe 2, to the proper keg. In the same way, by turning the hand wheel to the next position, in which the pointer will be brought to the division marked "Return dark beer," the same will be returned through its appropriate connections 25, 27, to its proper keg. It will be observed that the ports 29 are angularly offset in Figs. 5 and 7, to permit these separate operations; and as the connections are entirely separate there is no mixing of the beverages in the pipes themselves during the said operations. A further turning of the hand wheel cuts off all connections with the beer supplies and brings the "Drain coils" into connection which permits the beer in the cooling coils to be drained out through the pipe 58 into a sewer, if desired, or if water or cleansing fluid is in said coils the same will be likewise led to the sewer. A further turning of the hand wheel will bring the cleaning ports into communication and cleaning fluid will pass through the pipes and coils, and out of the faucets or it may be passed from said coils into the sewer, as above described. Lastly, if the hand wheel is turned still farther the ports 32 and 32' will be brought into register and the beer pump will force air into the reservoir until the pressure gets above a predetermined point, when the electric cut off described above will automatically stop the said pump. At any time, should the gas pressure in the kegs fall below that which is necessary to force all the beer to the bar, the air pressure in the reservoir 5 will exert its influence through the pipe 7 and manifold 8, and, therefore, cause the last portions of beer to be discharged. A reducing valve 150 controls the pressure actually delivered to the kegs.

In the operations above described, it was supposed that the pressure in the tank 5 was sufficiently low to cause the water motor to run. If such pressure is too high for this purpose, which will be indicated on the gage 6, said pressure may be readily reduced to the required point by simply turning any suitable cock as 151 and permitting some of the air to escape.

Coming now to the carbonating portion of this invention, it is well known that bars have a constant need for carbonated water to mix with their beverages, and to fill their siphon bottles and for other purposes. In order to supply this need, I provide one or more faucets 200, for carbonated water, which is supplied in the following manner: From the outer casing 11 of the multi-way valve leads the pipe 201, to which is joined at 202 the pipe 203, provided with the check valve 204, and connected with the reservoir 205, provided with the pipe 206 joined to the filter 207, fed by the city water supply 208. The pipe 209, provided with the check valve 210, leads from the connection 202 and enters the bottom of the carbonating vessel 211, terminating in any suitable spraying device 212, see Fig. 14. So far as now disclosed, it is evident when the pump is running that water will be drawn by the piston 22, through the ports 213 and 214, into the cylinder 21, from the filter 207 and reservoir 205, and that the check valve 210 will prevent the water in the chamber 211 from entering said cylinder. It is also evident, that, as the piston reverses its stroke, water will be forced out of said cylinder past the check valve 210 and through the carbonating nozzle 212 into the carbonating chamber 211. During this latter operation the check valve 204 will prevent the water from being forced back into the tank 205.

215 represents a supply of carbonic acid gas under pressure to which is connected the spraying nozzle 216, in the chamber 211 and the surplus of this gas that is not absorbed by the water will collect under pressure above the level 217 of the water where it will be led by the pipe 218 to the nozzle 219 in the second carbonating vessel 220, where the surplus gas again collects above the surface 221 of the water therein. The gas pressures in the two carbonators are by this connection rendered substantially equal, so that substantially the only work the pump has to do in forcing water from the lower to the higher tank is that required to lift the water. Therefore, although the pressures in the two tanks may be very high yet the pump readily forces partially carbonated water out of the lower tank and through the pipe 222 and carbonating nozzle 223 into the upper tank. From the carbonating tank 220, the unabsorbed gas is led through the pipe 225 and nozzle 226 into a third carbonating tank 227, where it again collects above the level 228 of the water therein. The carbonated water in the tank 220 may now flow by gravity, during the suction periods of the pump, through the pipe 230 and nozzle 231 into the tank 227, and be forced into said tank during the compression periods thereof. In the same way, the gas will pass from the tank 227 through the pipe 232 and nozzle 233 into the tank 234; will collect above the level 235 of the water therein; and will likewise pass through the pipe 236 and nozzle 237 into the tank 238 where it will collect above the water level 239, and finally pass through the pipe 240 into the storage reservoir 241, where all that portion of the gas which still remains unabsorbed will bubble up above the surface 242 of the completely carbonated water in said tank 241. Likewise the water under the action of the pump will be forced through the pipe 243 and nozzle 244 into the tank 234; out of the same through the pipe 245 and nozzle 246, into the tank 238; and out of the latter through the pipe 247 into the storage tank 241; all as will be readily understood from Fig. 14. After the water has been thoroughly carbonated, either by passing it through the whole series of tanks illustrated, or by a lesser number, such as only one tank, or two, its own gas pressure will force it up through pipe 250 and coil 251 to the faucet 200. It will be observed that as the gas reaches substantially atmospheric pressure in the tank 241, there will be little tendency for the gas to immediately escape from the water delivered at the faucet 200, and therefore, said water will not be liable to become flat at once. It will also be observed that from the system of tanks and pipes illustrated, a very high pressure may be employed in the gas tank 215, and, therefore, a very thorough carbonization of the water may be attained.

The indicator, Fig. 8, contains an additional division 255, to which the pointer may be directed and which will indicate the fact that the carbonating ports 214 and 213 are in register. The port 214, see Fig. 7, is so disposed on the multi-way valve, that when it is in register, all of the other ports are out of register. A valved carbonated water connection 260 is provided, between the pipe 40 and any suitable pipe under pressure, for example the pipe 225, through which carbonated water may be forced through the cleaning pipe 40 for cleaning the pipes. In the same way a valved pipe 266 may be led from the carbonated water reservoir 241 or delivery pipe 247, to the automatic pressure controller pipe 80, so as to cause the pump to start whenever the pressure in the said tank 241 becomes too low, or, in other words, whenever the supply of carbonated water becomes exhausted.

The operation of the carbonating portion of my invention will also be clear from the foregoing, but it may be briefly summarized as follows: When it is desired to manufacture carbonated water the valve 270 in the pipe 39 is closed, the pump is automatically started from the pressure in the tank 241 in the manner above disclosed; or it may be started in any other suitable manner; and water is sucked from the tank 205 and forced in and through the various carbonating tanks 211, 220, 227, 234, 238, and into the carbonated water tank 241. In the meantime, the gas passes from the carbonic acid gas tank 215 into and through the various carbonating tanks, being absorbed to a greater or less extent by the water in each tank, and finally it is delivered to the pipe 240 underneath the surface 242 of the carbonated water in the tank 241, all as above set forth, whence it escapes into the atmosphere through the cock 265. Whenever the supply of carbonated water is high the pressure in the pipe 266 will also be high, the contact 84 closed, and the water to the motor pump cut off, so no more carbonated water will be made. But when this pressure falls, the Bourdon tube 81 will close the contact 83, and automatically start the carbonating pump in the manner above disclosed. Since the pipe 266 leads from a point above the tank 241, it will be filled with gas that has escaped from the carbonated water, so that very little water itself will reach the tube 81, but since the tube will operate under water pressure as well as under gas pressure it makes little difference if water does enter the same.

Carbonated water is useful as a cleaning medium, and it is evident that the same may be pumped through the pipe system upon opening the cock 271 and closing the cock 272; or both cleaning fluid and carbonated water may be used if the cock 272 be left open. Again, I may close the cocks 272 and 273 and pump up the air reservoir 5 to a high pressure, and then pump up the reservoir 241 to a high but less pressure, by opening the cock 273, as well as the cock 274 in the by-pass 275, between the water supply 90 and the motor 276, Fig. 1. In such case, the air pressure in the tank 5 being the greater may be used to blow carbonated water through the various connections.

That portion of this invention which relates exclusively to the dispensation of beer is made the subject of my application for beer disposing apparatus, Number 503,240, filed June 19, 1909 and allowed August 30, 1909.

It will be obvious that changes in the details of construction and arrangement of parts may be made by those skilled in the art, without departing from the spirit of this invention and, therefore, I do not wish to be limited to such features, except as may be required by the claims.

I claim—

1. In a dispensing apparatus, the combination of a beer supply; a service pipe connected to the same provided with a cooling coil; a multi-way valve connected to said service pipe; a source of carbonated water connected to said multi-way valve; and a pump adapted to suck beer out of said cooling coil and to force carbonated water therethrough; substantially as described.

2. In a dispensing apparatus, the combination of a beer supply; a service pipe connected to the same provided with a cooling coil; a multi-way valve connected to said service pipe; a source of carbonated water connected to said multi-way valve; a pump adapted to suck beer out of said cooling coil and to force carbonated water therethrough; and an independent service pipe connected to said carbonated water supply; substantially as described.

3. In a dispensing apparatus the combination of a water supply 208; a multi-way valve connected therewith; a pump in said valve; a source of carbonated water connected to said pump; a cooling coil 4; a beer supply connected to said coil 4; and connections by which carbonated water may be forced by said pump through said cooling coils; substantially as described.

4. In a dispensing apparatus, the combination of a beer supply; a multi-way valve connected therewith; a cooling coil connected to said valve; an air pressure tank connected to said multi-way valve; a source of carbonated water connected to said multi-way valve; a pump adapted to suck beer out of said cooling coil, to force air into said tank, and to force carbonated water through said cooling coil; and automatic means for controlling said pump; substantially as described.

5. In a dispensing apparatus, the combination of a suitable water supply 208; a service pipe, cooling coil 4 and a supply of carbonated water; a multi-way valve and pump in said valve connected with said supply of carbonated water and cooling coil and adapted to suck water out of said supply and force the same into said carbonated water supply; a motor for said pump; and an automatic means for controlling said motor and pump, substantially as described.

6. In a dispensing apparatus, the combination of a system of piping; a multi-way valve; a pump in said valve; a source of carbonated water; a hand wheel; gear connections between said hand wheel and valve; connections with said piping controlled by said hand wheel leading from said valve to said source of carbonated water, substantially as described.

7. In a beverage dispensing apparatus; the combination of a multi-way valve; a pump in said valve; a supply of carbonated water connected with the pump; a hand wheel; an indicator operated by said hand wheel; connections between said wheel and valve; a motor for operating said pump; and automatic means for controlling said motor; substantially as described.

8. In a dispensing apparatus, the combination of a source of carbonated water; a bar; connections between said source and said bar; a multi-way valve in said connections; a pump in said multi-way valve; a hand wheel connected with said valve; an indicator operated by said wheel; a motor for said pump; an electromagnetic controller for said motor and a source 50 of cleansing fluid connected to said valve and pump, substantially as described.

9. In a dispensing apparatus, the combination of a source of beer supply; a bar; connections between said source of supply and said bar; a multi-way valve in said connections; a pump in said multi-way valve; a hand wheel connected with said valve; an indicator operated by said wheel; a motor for said pump; an electromagnetic controller for said motor; a source of carbonated water under pressure connected to said controller; and a source of cleansing fluid connected to said valve and pump; substantially as described.

10. In a dispensing apparatus, the combination of a multi-way valve; a pump in said valve; a gear connection for rotating said valve; a supply of carbonated water connected to said pump and valve; and automatic means for controlling said pump, substantially as described.

11. In a dispensing apparatus, the combination of a pipe system; a multi-way valve connected to said system; a pump in said valve; a carbonated water reservoir; connections between said pump and said reservoir; gear connections for rotating said valve; and automatic means for controlling said pump; substantially as described.

12. In a dispensing apparatus, the combination of a system of pipes; a multi-way valve controlling said pipes; a pump in said valve; a carbonated water reservoir; connections between said pump and said reservoir; gear connections for rotating said valve; a motor for said pump; a water supply for said motor; and automatic means connected to said reservoir for controlling said motor and pump, substantially as described.

13. In a dispensing apparatus, the combination of a supply of carbonated liquid; a pump for the same; a motor for the pump; a pair of magnets; a water supply for the motor; a valve controlling said supply; a connection between said valve and the armature of one of said magnets; and a locking connection between said valve and the armature of the other magnet; substantially as described.

14. In a dispensing apparatus, the combination of a supply of carbonated liquid; a pump for the same; a motor for the pump; a water supply for the motor; automatic means comprising a pivoted lever and a reciprocating lug for reversing said motor; and automatic means for controlling said water supply, substantially as described.

15. In a dispensing apparatus, the combination of a supply of carbonated liquid; a delivery for the same; a pump; a valve; gear connections comprising a hand wheel for operating said valve; and an indicator operated by said hand wheel comprising a reciprocating rack; a pinion geared thereto; and a pointer connected with said pinion; substantially as described.

In testimony whereof, I affix my signature, in presence of two witnesses.

ALVA D. JONES.

Witnesses:
T. A. WITHERSPOON,
R. M. PARKER.